US010720798B2

(12) United States Patent
Yang et al.

(10) Patent No.: US 10,720,798 B2
(45) Date of Patent: Jul. 21, 2020

(54) COIL CONFIGURATION IN A WIRELESS POWER TRANSMITTER

(71) Applicant: INTEL CORPORATION, Santa Clara, CA (US)

(72) Inventors: Songnan Yang, San Jose, CA (US); Essam Elkhouly, Santa Clara, CA (US); Qiubing Ding, Shanghai (CN); Ze An Xia, Shanghai (CN); Shahar Porat, Geva Carmel (IL)

(73) Assignee: Intel Corporation, Santa Clara, CA (US)

(*) Notice: Subject to any disclaimer, the term of this patent is extended or adjusted under 35 U.S.C. 154(b) by 168 days.

(21) Appl. No.: 15/572,216

(22) PCT Filed: Jun. 4, 2015

(86) PCT No.: PCT/CN2015/080755
§ 371 (c)(1),
(2) Date: Nov. 7, 2017

(87) PCT Pub. No.: WO2016/192075
PCT Pub. Date: Dec. 8, 2016

(65) Prior Publication Data
US 2018/0152059 A1 May 31, 2018

(51) Int. Cl.
H02J 50/90 (2016.01)
H01F 38/14 (2006.01)
(Continued)

(52) U.S. Cl.
CPC ............ H02J 50/90 (2016.02); H01F 38/14 (2013.01); H02J 7/025 (2013.01); H02J 50/10 (2016.02);
(Continued)

(58) Field of Classification Search
None
See application file for complete search history.

(56) References Cited

U.S. PATENT DOCUMENTS 9,685,792 B2* 6/2017 Yang ................. H01F 27/28
2012/0161535 A1* 6/2012 Jung ................. H02J 50/40
307/104

(Continued)

FOREIGN PATENT DOCUMENTS

CN 103944281 A 7/2014
WO 2012128093 A1 9/2012
WO 2014118615 A2 8/2014

OTHER PUBLICATIONS

International Search Report and Written Opinion for International PCT Application PCT/CN2015/080755 filed on Jun. 4, 2015 dated Feb. 18, 2016, 11 pages.

Primary Examiner — Lincoln D Donovan
Assistant Examiner — Khareem E Almo
(74) Attorney, Agent, or Firm — International IP Law Group, P.L.L.C.

(57) ABSTRACT

Techniques for coil configuration in a wireless power transmitter in a system, method, and apparatus are described herein. An apparatus for coil configuration in a wireless power transmitter may include a transmitting coil comprising an inner portion and an outer portion, and a switch configured to initiate current on the inner portion based on a detected condition.

22 Claims, 8 Drawing Sheets

(51) Int. Cl.
*H02J 50/12* (2016.01)
*H04B 5/00* (2006.01)
*H02J 50/80* (2016.01)
*H02J 50/10* (2016.01)
*H02J 7/02* (2016.01)

(52) U.S. Cl.
CPC .............. *H02J 50/12* (2016.02); *H02J 50/80* (2016.02); *H04B 5/0037* (2013.01); *H04B 5/0075* (2013.01)

(56) References Cited

U.S. PATENT DOCUMENTS

| | | | |
|---|---|---|---|
| 2014/0015341 A1* | 1/2014 | Kagami | H02J 5/005 307/104 |
| 2015/0280448 A1* | 10/2015 | White, II | H01F 38/18 307/104 |
| 2015/0303733 A1* | 10/2015 | Yang | H01F 27/2823 320/108 |
| 2016/0164332 A1* | 6/2016 | Elkhouly | H02J 50/12 320/108 |
| 2017/0063128 A1* | 3/2017 | Van Bosch | H02J 7/025 |
| 2017/0361111 A1* | 12/2017 | Stouffer | H02J 50/90 |
| 2018/0061563 A1* | 3/2018 | Budhia | H02J 50/10 |

\* cited by examiner

600

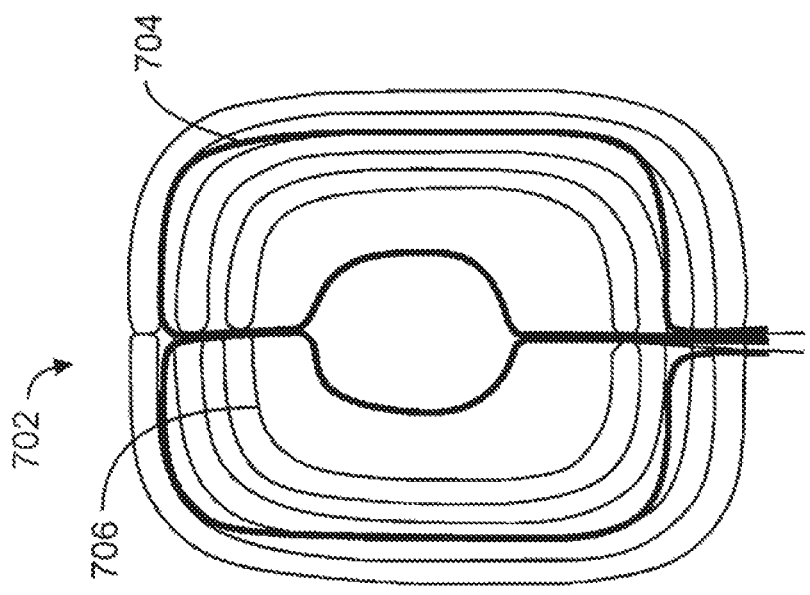
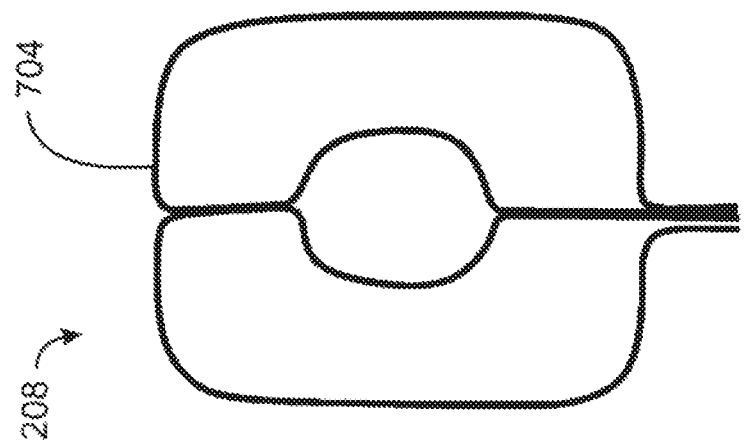
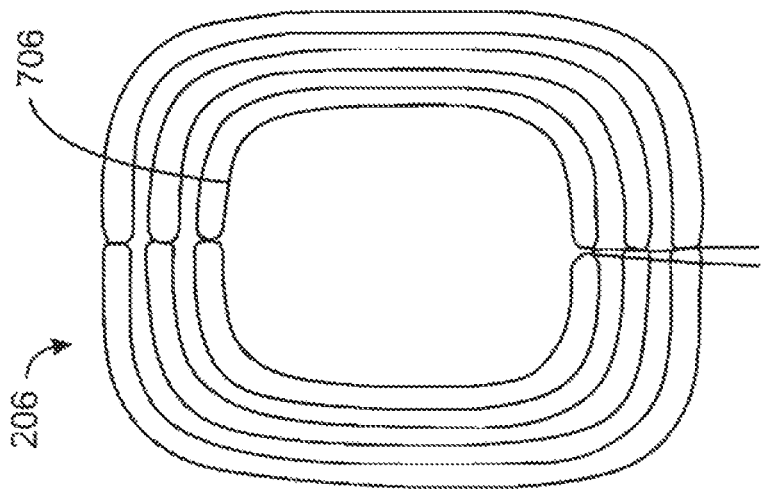
FIG. 7

800

COIL CONFIGURATION IN A WIRELESS POWER TRANSMITTER

CROSS REFERENCE TO RELATED APPLICATIONS

Pursuant to 35 U.S.C. § 371, this application is the United States National Stage Application of International Patent Application No. PCT/US2015/080755, filed on Jun. 4, 2015, the content of which is incorporated by reference as if set forth in its entirety herein.

TECHNICAL FIELD

This disclosure relates generally to techniques for wireless charging. Specifically, this disclosure relates to coil configuration in a wireless power transmitter.

BACKGROUND ART

A basic wireless charging system may include a wireless power transmitter unit (PTU) and a wireless power receiving unit (PRU). For example, a PTU may include a transmit (Tx) coil, and a PRU may include receive (Rx) coil. Magnetic resonance wireless charging may employ a magnetic coupling between the Tx coil and the Rx coil. In some cases, a PRU may be implemented in a computing device, such as a mobile computing device, that can be placed on a charging mat including a PTU. In some cases, magnetic field uniformity design goals may drive PTU coil design toward a high number of closely spaced turns and relatively higher energy loss when transferring power between PTU and PRU coils, while for large separation between a PRU and a PTU in a direction perpendicular to a surface of the PTU may require a minimum coil coupling efficiency, driving design of PTU coil toward less turns with large spacing for lowest energy loss when transferring power between PTU and PRU coils.

BRIEF DESCRIPTION OF THE DRAWINGS

FIG. 7 is a diagram illustrating a transmitter coil having a portion interleaved with the outer portion.

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE ASPECTS

Figure 1:
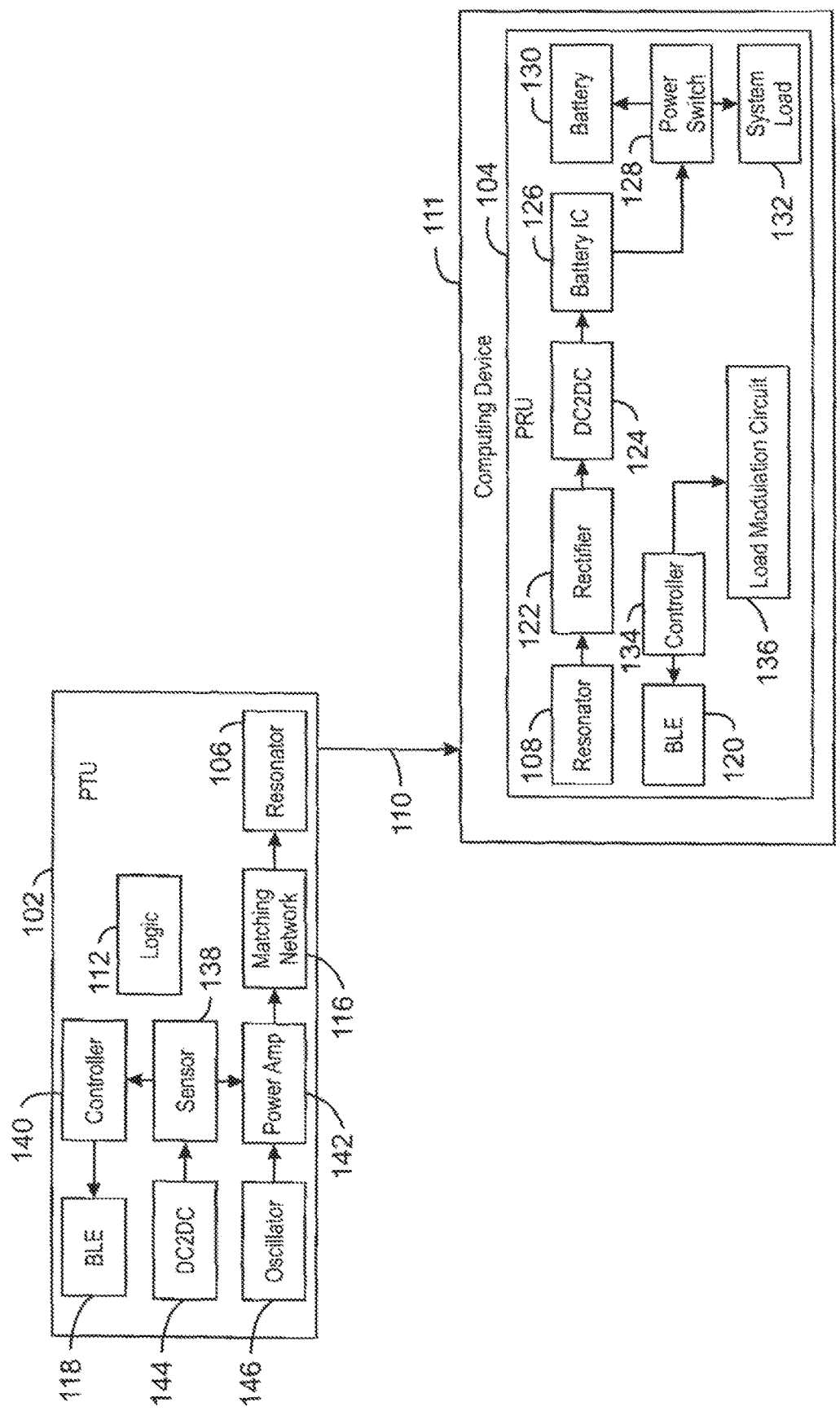
FIG. 1 is block diagram of a PTU to provide power to a PRU, wherein the PTU includes logic configured to configure a coil based on a detected condition.

The present disclosure relates generally to techniques for wireless charging. Specifically, the techniques described herein include an apparatus in a wireless power transmitting unit (PTU) having a Tx coil including two portions: an outer portion that is on during transmission of wireless power and an inner portion that may be turned on or off during transmission of wireless power in order to adjust magnetic field uniformity in view of separation distances between the Tx and an inductively coupled Rx coil. As discussed above, in some cases, magnetic field uniformity design goals may drive design toward a high number of closely spaced turns and relatively higher energy loss relative to energy emitted from an Tx coil of a PTU, while for large separation between a power receiving unit (PRU) and the PTU in a direction perpendicular to a surface of the PTU may require a minimum coupling efficiency driving design toward less turns with larger spacing for lowest energy loss relative to energy emitted from the Tx coil. In other words the techniques described herein dynamically changing a coil configuration may be useful in order to obtain high quality (Q) factor depending on a detected condition such as a separation distance.

A Q factor, as referred to herein, is a measure of energy loss relative to energy supplied and stored in a resonator, such as a Tx coil of a PTU. In the present scenario, the Q factor may be a measure of energy used to generate a magnetic field at the Tx coil in comparison to the amount of energy that is lost in terms of heat generation at the Tx coil.

A separation distance, as referred to herein, is distance in a direction perpendicular to the surface of a PTU to a PRU. For example, a PTU may be placed under a table for convenient tabletop charging of a computing device having a PRU when placed on a top surface of the table. In this scenario, the separation distance between the PRU and the PTU may be larger than a separation distance occurring when the PRU is placed directly on top of a charging pad having a PTU. In the tabletop charging scenario with the PTU under the table, a condition may be detected indicating the larger separation distance, and the Tx coil may be configured to discontinue current on the inner portion of the Tx coil to redistribute the magnetic field and to obtain a higher Q than would otherwise occur.

An inner portion, as referred to herein may be one or more coil turns configured to be smaller in circumference than a largest turn of an outer portion. In other words, in some configurations discussed below in regard to FIG. 7, an inner portion may be larger in diameter than one or more turns of the outer portion.

The techniques described enable one PTU design to fit multiple potential usage cases automatically and deliver better user experience. In general, the techniques described herein include a reconfigurable coil that can have two or more different configurations. One of them is optimized to support field uniformity requirement at small separation distances, while another is optimized for maximum efficiency at large separation distances. The reconfiguration may be realized by one or more switching components on the Tx coil triggered by input of one or more sensors in the PTU circuit detecting a condition.

Further, in some cases, the detected condition may indicate something else other than, or in addition to, the separation distance. For example, a detected condition may indicate that a computing device having a PRU includes a relatively large chassis. A reactance shift may occur due to interaction of the magnetic field generated by the PTU and the relatively large chassis in comparison to smaller chassis computing devices. In this scenario, the Tx coil may be configured to boost magnetic coupling with the PRU in view of the large chassis interaction by initiating current on the inner portion and while continuing to supply current to the outer portion, as discussed in more detail below.

In some cases, the techniques discussed herein may be implemented using a wireless charging standard protocol, such as the specification provided by Alliance For Wireless Power (A4WP) version 1.3, Nov. 5, 2014. A wireless power receiving (Rx) coil may be a component in a power receiving unit (PRU), while a wireless power transmission (Tx) coil may be a component in a power transmitting unit (PTU), as discussed in more detail below. However, the techniques described herein may be implemented using any other wireless charging standard protocol where applicable.

FIG. 1 is block diagram of a PTU to provide power to a PRU, wherein the PTU includes logic to configure a coil based on a detected condition. A PTU 102 may couple to a PRU 104 via magnetic inductive coupling between resonators 106, and 108, as indicated by the arrow 110. The PRU 104 may be a component of a computing device 111 configured to receive charge by the inductive coupling 110. The resonator 106 may be referred to herein as a Tx coil 106 of the PTU 102. The resonator 108 may be referred to herein as an Rx coil 108 of the PRU 104.

As illustrated in FIG. 1, the PTU 104 may include logic 112. The logic 112 may be referred to herein as detection logic 112. The detection logic 112 may be configured as an integrated component of the PTU, such as a component of a controller 114, a component of the matching network 116, as a separate component, of as an integrated component any other component of the PTU 102, or any combination thereof.

In any case, the detection logic 112 may be configured to detect a condition triggering a reconfiguration of the Tx coil 106. For example, the detection logic 112 may include a sensor, such as an orientation sensor, configured to detect an orientation associated with a separation distance, as discussed in more detail below in regard to FIG. 2. Examples of an orientation sensor may include any combination of a gyrometer, accelerometer, inclinometer, and the like. Upon detection of a condition indicating a larger increase in separation distance, the logic 112 may be configured to reconfigure the Tx coil 106 by decreasing current on an inner portion of the Tx coil 106 to increase the Q factor of the inductive coupling 110. As another example, a wireless handshake between the PTU 102 and the PRU 104 may indicate a size category of the computing device 111 and the Rx coil 108. In some cases, the wireless handshake is performed by a Bluetooth Low Energy (BLE) module 118 of the PTU 102 and a BLE module 120 of the PRU 104. In the A4WP standard, the wireless handshake may indicate a size category of the PRU 104 having a predefined reactance shift detected at the matching network 114. However, in some cases, a larger chassis of the computing device 111 may interact with the inductive coupling 110 via interference with the magnetic field flux generating the inductive coupling 110. In this case, a reactance shift above a predefined threshold expected for size category may be detected by the matching network 114. Upon detection of the reactance shift above the predefined threshold, the logic 112 may be configured to boost the inductive coupling 110 by increasing the number of coil turns having current driven on them. In other words, the logic 112 may be configured to initiate current on an inner portion of the Tx coil 108.

The detection logic 112 may be composed of one or more components, such as electronic circuit components. In some cases, the detection logic 112 may implement one or more capacitors, inductors, and the like to drive different currents on different portions of the Tx coil 110, to drive a current with different amplitude on one portion of the Tx coil, to introduce a phase shift in the inductive coupling 110, or any combination thereof. Additional details are discussed in more detail below in regard to FIG. 2, as well as throughout the present description, Figures, and claims.

In FIG. 1, inductive coupling may occur between the Tx coil 106 and the Rx coil 108, and as a magnetic flux associated with the inductive coupling passes through the Rx coil 108, the computing device 111 may receive power. A rectifier 122 may receive voltage having an alternating current (AC) from the Rx coil 108 and may be configured to generate a rectified voltage (Vrect) having a direct current (DC). As illustrated in FIG. 1, a DC2DC converter 124 provides a DC output to a battery IC 126, a power switch 128, and a battery 130, as well as system load 132. However, in some cases, the DC2DC converter 122 may be implemented as a component of the battery charger IC 114 eliminating one buck stage and potential inefficiency that may otherwise occur if the DC2DC converter 122 were implemented as a discrete component as illustrated in FIG. 1.

The PRU 104 may also include a controller 134 configured to initiate a wireless broadcast having wireless handshake data. As discussed above, the wireless handshake broadcast may be carried out by a wireless data transmission component such as BLE module 120. In some cases, the wireless data transmission component may be integrated as operations of the controller 134, a load modulation circuit 136, the direct current to direct current (DC2DC) converter 125, or any combination thereof, wherein the data transmission may be indicated by patterns in the load modulation.

The PTU 102 may include the BLE module 118 configured to communicate with the BLE module 120. The PTU 102 may also include a current sensor 138, a controller 140, a power amplifier 142, a DC2DC converter 144, an oscillator 146, and the matching network 116. The current sensor 138 may be an ampere meter, a volt meter, or any other sensor configured to sense load variations occurring due to inductive coupling between the PTU 102 and another object, such as the PRU 104. The current sensor 138 may provide an indication of load change to the controller 140 of the PTU 102. The controller 140 may power on the power amplifier 142 configured to receive direct current (DC) from the DC2DC converter 144, and to amplify and oscillate the current. The oscillator 146 may oscillate the power provided at a given frequency and the matching network 116 may be used to match the amplified oscillation provided to the resonator 106 of the PTU 102.

The block diagram of FIG. 1 is not intended to indicate that the PTU 102 and/or the PRU 104 are to include all of the components shown in FIG. 1. Further, the PTU 102 and/or the PRU 104 may include any number of additional components not shown in FIG. 1, depending on the details of the specific implementation.

Figure 2:
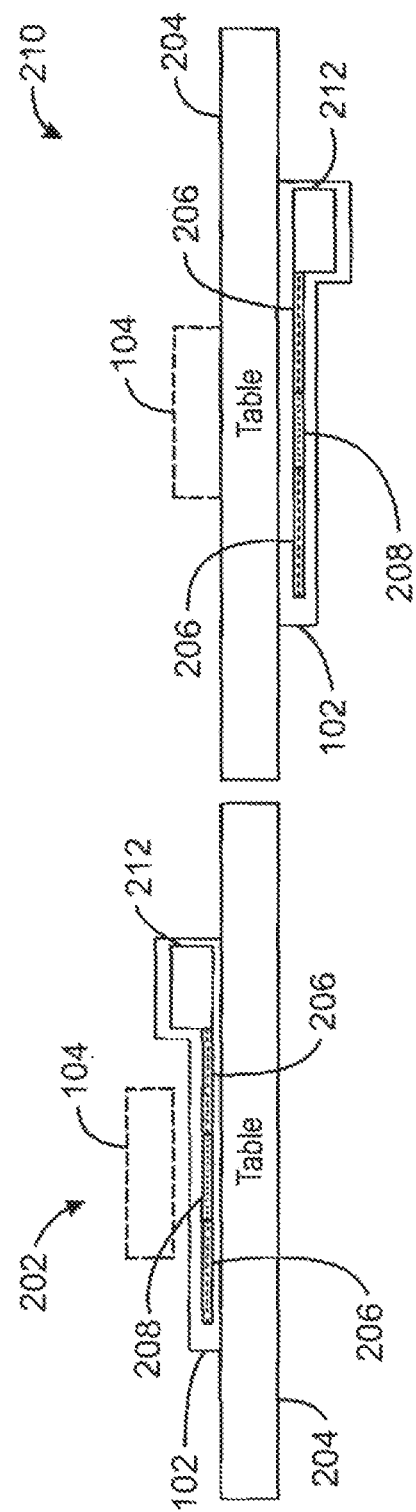
FIG. 2 is an illustration of an environment wherein a detected condition can trigger a certain configuration of a coil.

FIG. 2 is an illustration of an environment wherein a detected condition can trigger a certain configuration of a coil. As discussed above, a detected condition may indicate a larger separation distance between a PRU and PTU, such as the PTU 102 and PRU 104 of FIG. 1. In FIG. 2, the PTU 102 may be placed in a table top orientation, as indicated at 202, wherein the PTU 102 is placed on a top surface of a table 204. The PTU 102 may include an outer portion indicated at 206 and an inner portion indicated at 208. In the table top orientation 202, the PRU 104 may be placed directly on the PTU 102, as opposed to on the surface of the table when the PTU 104 is affixed in an under table orientation as indicated at 210. As illustrated in FIG. 2, the separation distance may be larger in the under the table orientation 210 relative to the separation distance in the table top orientation 202. Therefore, the Tx coil of the PTU 102 may be reconfigured based on a detection of a given orientation. For example, the detection logic 112 may include a sensor in PTU circuitry 212 may include an orientation sensor configured to detect a right side up orientation at 202 versus an upside down orientation at 210.

Although FIG. 2 illustrates that in the under table orientation 210, the PTU 102 is flipped upside down, it is contemplated that in some cases, the PTU 102 may be affixed in the under table orientation 210 right side up. In this scenario, rather than detecting the under table orientation 210 by an orientation sensor indicating orientation, the detection logic 112 may be configured to toggle on and off the inner portion 208. In an "on" position, data related to Vrect, rectified current (Irect), or any combination thereof, may be provided or detected from the PRU 104. In an "off" position, data may also be gathered relating to Vrect, Irect, or any combination thereof. Then, the detection logic 112 may compare Vrect, Irect, or any combination thereof, in each position to determine which configuration will result in the highest Q factor as a result of the separation distance.

Figure 3:
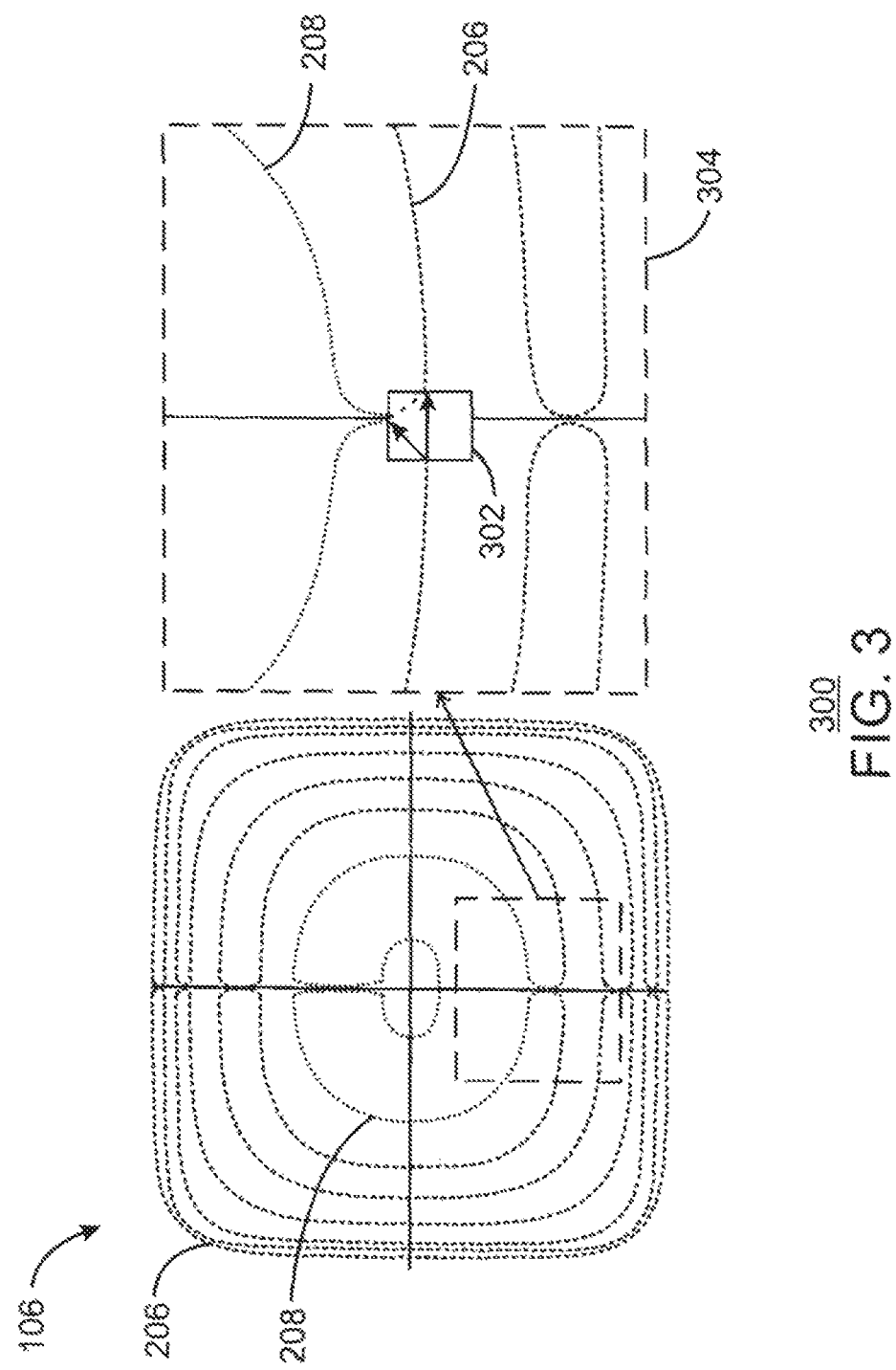
FIG. 3 is a diagram illustrating a coil having a reconfigurable component.

FIG. 3 is a diagram illustrating a coil having a reconfigurable component. As discussed above in regard to FIG. 1 and FIG. 2, the Tx coil 106 may include an outer portion 206 and an inner portion 208. Current may be initiated on the inner portion 208 based on a detected condition, such as the table top orientation 202 discussed above in FIG. 2. However, the current driven on the Tx coil 106 may be discontinued or altered on the inner portion 208 during the under table orientation 210 wherein the separation distance increases. As illustrated in FIG. 3, current may be initiated or discontinued on the inner portion 208 by toggling a switch indicated at 302 in the expanded view of the dashed box 304.

While FIG. 3 illustrates that current is driven in the inner portion 208 and the outer portion 210 in series, the inner portion 208 may be driven parallel to the outer portion 210. Further, as discussed above in regard to FIG. 1, components of the detection logic 112 may include tuning capacitors, inductors, and the like configured to initiate phase shifting resulting in changes in the magnetic field distribution.

Figure 4:
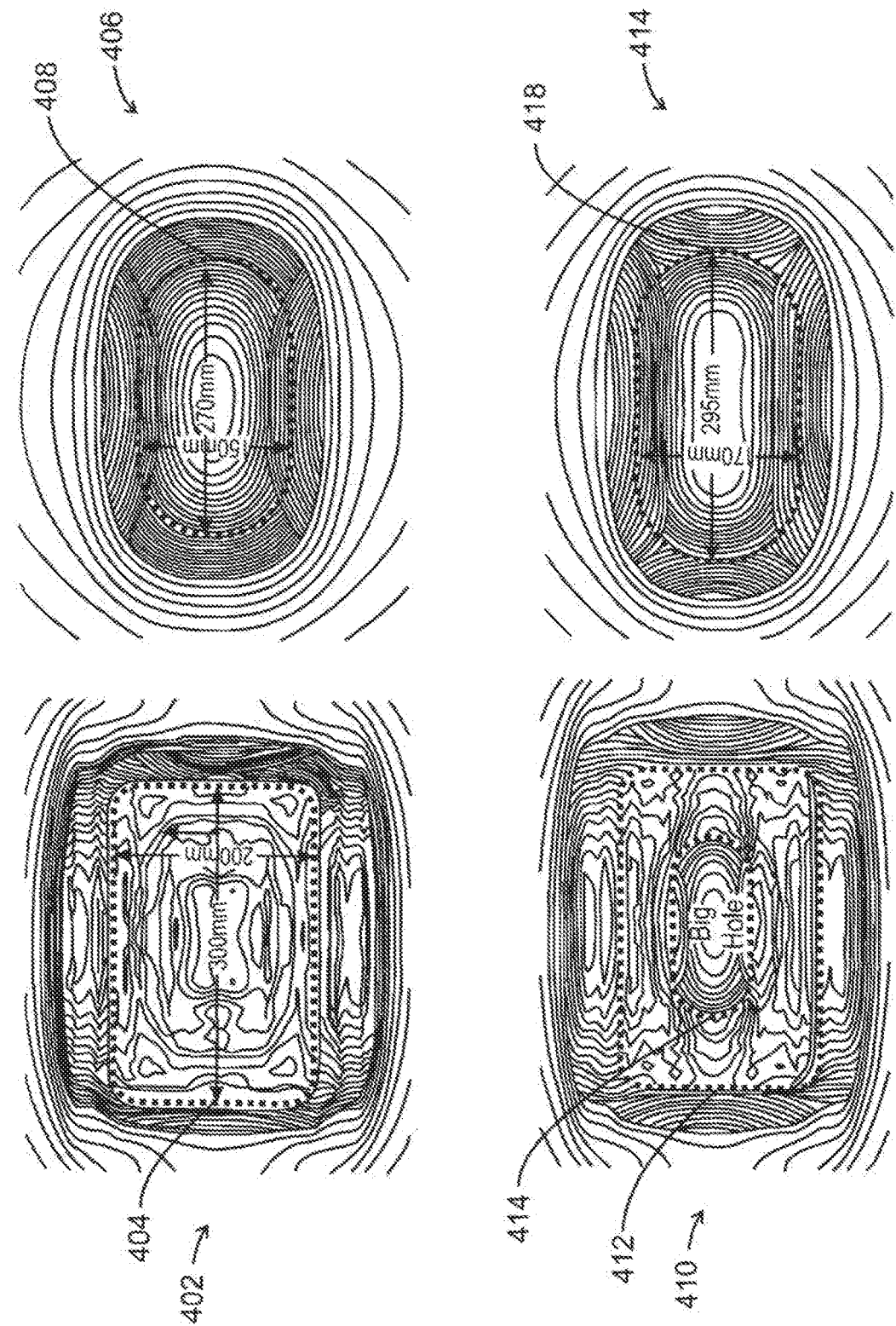
FIG. 4 is a diagram illustrating magnetic field distributions for various coil configurations and at various separation distances.

FIG. 4 is a diagram illustrating magnetic field distributions for various coil configurations and at various separation distances. The example at 402, a Tx coil, such as the Tx coil 106 of FIG. 1, drives current to both an inner portion and an outer portion, such as the outer portion 206 and the inner portion 208 of FIG. 2 and FIG. 3. As indicated by the dashed box 404, a resulting uniform area when a separation distance from PTU 102 to PTU 104 is about 5 millimeters (mm) is about 300 mm×200 mm. However, when, at 406, the separation distance is 50 mm, such as in the under table orientation 210 of FIG. 2, the area that yields certifiable coupling efficiency between PTU and PRU resonators is about 150 mm×270 mm, as indicated the dashed area 408.

As discussed above, the techniques described herein include dynamically configuring the Tx coil 106 based on detected conditions. At 410, the separation distance is still 5 mm similar to 402, but the magnetic field distribution at 5 mm indicated by the dashed box 412 includes a large area of decreased uniformity, as indicated by the dashed box 414. The area of decreased uniformity 414 is caused by discontinuing to drive current on the inner portion 208 discussed above in regard to FIG. 2 and FIG. 3. However, at the separation distance of 50 mm indicated at 416, the area 418 of certifiable coupling efficiency between PTU and PRU resonators is relatively larger than the certifiable area 408 wherein both the inner portion 208 and the outer portion 206 are being driven by the same current. Specifically, at a 50 mm separation distance the area 418 is about 170 mm×295 mm. In other words, the area 408 is smaller than the area 418 as a result of a reconfiguration of the Tx coil 106 having only the outer portion 206 being driven with current.

Figure 5:
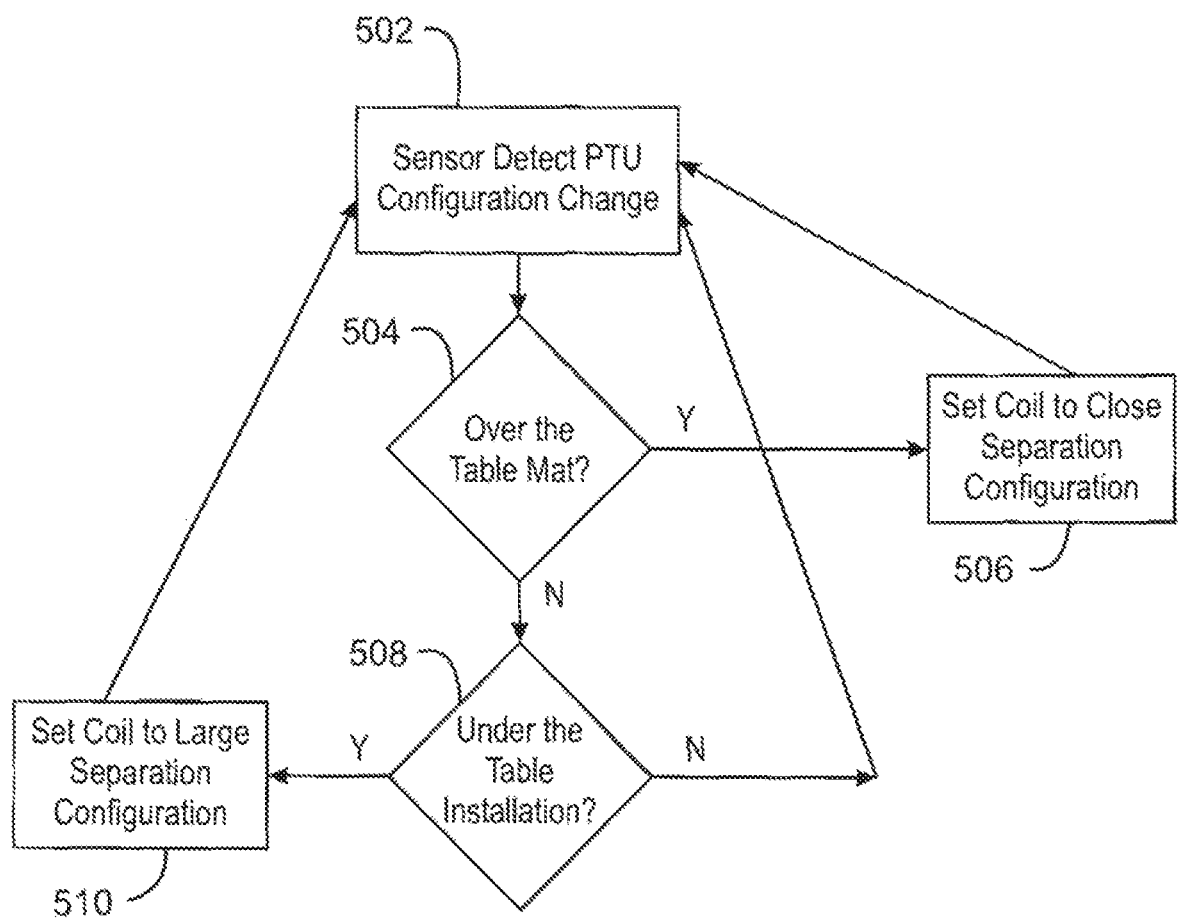
FIG. 5 is a flow chart illustrating a process for configuration of a transmitter coil according to a detected potential separation distance.

FIG. 5 is a flow chart illustrating a process for configuration of a transmitter coil according to a detected potential separation distance. In FIG. 5, the example of configuration includes the orientation discussed above in regard to FIG. 2 and table top orientation 202 versus the under table orientation 210. The process 500 begins at 502 wherein a sensor, such as a sensor of the detection logic 112 of FIG. 1, detects a configuration change. In some cases, prior detection 502 may include scanning for any configuration change. At block 504, a determination is made as to whether the PTU 102 is in the table top orientation 202 or not. If yes, then the Tx coil 106 is set to a close separation configuration wherein both the inner portion 206 and the outer portion 208 are driven, as indicated at 506, and the process returns to 502. If the PTU 102 is not in the table top orientation 202, the process 500 includes determining whether the PTU 102 is in the under table configuration 210, as indicated at 508. Determining 508 if the PTU 102 is in the under table configuration 202 may be performed by various methods. For example, as discussed above, an orientation sensor may be referenced by the detection logic 112 to determine a given orientation. As another example, the detection logic 112 may receive a manual indication from a button or other input device indicating a given orientation. As another example, the detection logic 112 may be connected to a circuit that is toggled when the PTU 102 is affixed to the under table orientation 210 via a fastening device, such as a screw. Other examples are contemplated.

In any case, if the under table orientation 210 is not determined at 508, the process 500 returns to 502 wherein scanning for configuration changes is continued. If the under table orientation 210 is determined, then the Tx coil 106 is set to a large separation distance configuration at block 510.

Figure 6:
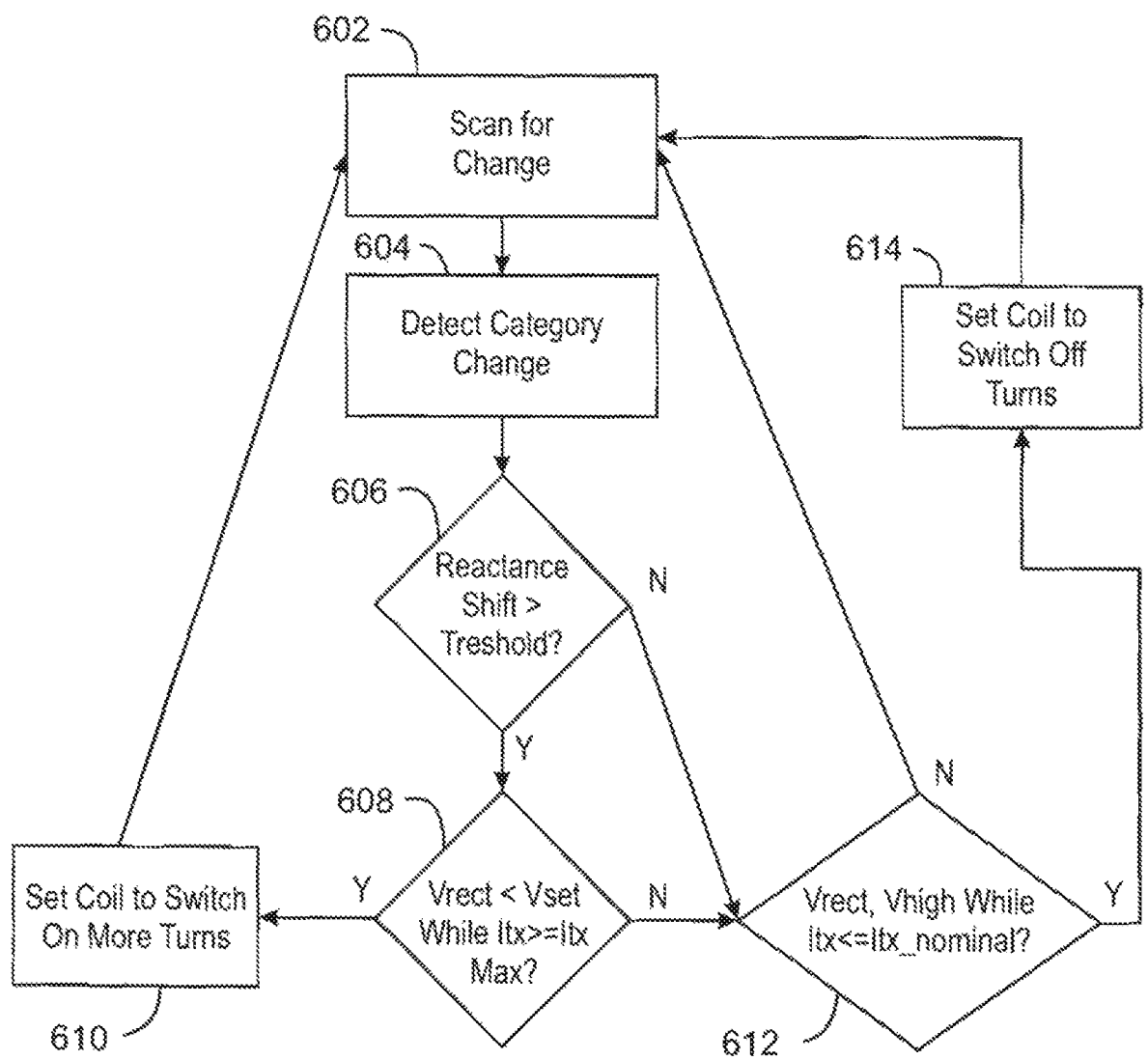
FIG. 6 is a flow chart illustrating a process for transmitter coil configuration according to a detected overlap between the transmitter coil and a receiver coil.

As mentioned above in regard to FIG. 2, although in the under table orientation 210 may be detected at by an orientation sensor indicating orientation, the detection at 502 may be carried out by toggling on and off the inner portion 208. In an "on" position, data related to Vrect, rectified current (Irect), or any combination thereof, may be provided or detected from the PRU 104. In an "off" position, data may also be gathered relating to Vrect, Irect, or any combination thereof. Then, the detection logic 112 may compare Vrect, Irect, or any combination thereof, in each position to determine which configuration will result in the highest Q factor as a result of the separation distance FIG. 6 is a flow chart illustrating a process for transmitter coil configuration according to a detected overlap between the transmitter coil and a receiver coil. As discussed above, detection may include detecting a category indicating a size of a PRU, such as the PRU 104 and a corresponding reactance shift expected from the Rx coil 108. At block 602, the detection logic 112 of FIG. 1 may scan for changes in a condition. At block 604, a change in condition is detected. In the example process 600, the changed detection indicates a category change of a device under charge. At block 606, a determination is made as to whether a reactance shift is greater than a threshold. As discussed above, a given device under charge have an expected reactance shift threshold determined prior by way of the wireless handshake between BLE modules 118 and 120. If, at block 606 the reactance shift is above the expected reactance shift threshold, a determination is made at block 608 as to whether Vrect is less than a set voltage (Vset) predefined for optimal wireless charging between the PTU 102 and the PRU 104. At block 608, if Vrect is less than Vset while transmitted current (Itx) is greater than or equal to a maximum current (Itx_max), the process 600 may continue to block 610 wherein more coil turns are switched on. For example, the Tx coil 106 may initiate current on the inner portion 208 as well as continuing to drive current on the outer portion 206 in order to boost coupling when the Tx coil 106 and the Rx coil 108 overlap to a certain degree indicated by the reactance shift being over the expected reactance shift threshold.

If, at block 608, the Vrect is less than Vset but the transmitted current (Itx) is less than or equal to a maximum current (Itx_max), the process 600 may continue to block 612. At block 612, the process 600 includes determining whether the Vrect is less than a high voltage (Vhigh) associated with a maximum amount of voltage for a given PTU 102 and PRU 104 combination. If Vrect is less than Vhigh and Itx is less than or equal to a nominal transmitting current (Itx_nominal), then the process 600 continues at 614, wherein the inner portion 208 of the Tx coil 106 is switched off to reduce the inductive coupling 110 when the PTU 102 and the PRU 104 overlap less.

As indicated in FIG. 6, if the reactance shift is not over the expected reactance shift threshold at block 606, the process 600 may skip 608 and proceed to block 612. Further, if the Vrect is greater than Vhigh while Itx is less than or equal to Itx_nominal, then the process 600 may skip 614 and return to block 604.

FIG. 7 is a diagram illustrating a transmitter coil having a portion interleaved with the outer portion. Although FIG. 2 and FIG. 3 illustrate that the inner portion 208 is wholly within the outer portion 206, other exemplary aspects are considered herein. For example, in FIG. 7, the outer portion 206 may be combined with the inner portion 208 in an interleaved configuration as indicated at 702. Specifically, an outer turn of the inner portion 208 may be larger than the inner turn 706 of the outer portion 206. Other designs are contemplated comprising more turns on each of the inner portion 208, more turns on the outer portion 206, or any combination thereof.

Figure 8:
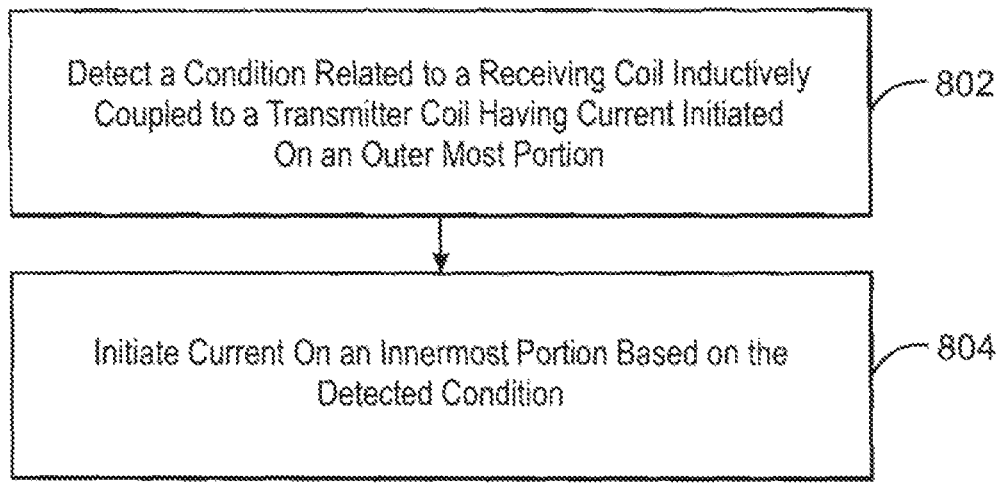
FIG. 8 is a block diagram illustrating a method for coil configuration in a wireless power transmitter.

FIG. 8 is a block diagram illustrating a method for coil configuration in a wireless power transmitter. At block 802, a method 800 may include detecting a condition related to a receiving coil inductively coupled to a transmitter coil having current initiated on an outer portion. At block 804, the method 800 may include initiating current on an inner portion based on the detected condition.

In some cases, the detected condition may include a separation distance between the Tx coil 106 and the Rx coil 108. In this case, initiating the current at block 804 on the inner portion includes generating an increase in magnetic field uniformity of the transmitter coil based on the detected separation.

In some cases, the method 800 may further include detecting a reactance shift due to a measure of coil overlap between the Tx coil 106 and the Rx coil 108. In this scenario, the method 800 may further include discontinuing current on the inner portion of the transmission coil upon detection of the reactance shift to reduce magnetic coupling of the transmission coil to the receiver coil.

In some cases, the method further includes initiating wireless charging components configured to change characteristics of current driven on the inner portion in comparison the outer portion. In some cases, the inner portion is electrically coupled to the outer portion in series. However, in some cases, the inner portion is electrically coupled to the outer portion in parallel.

Detecting the condition at 802 may include detecting an orientation of the wireless power transmitter potentially associated with the detected condition. Further, in some cases, initiating current at block 804 on the inner portion is performed dynamically during wireless power charging operations of the wireless power transmitter.

EXAMPLES

Example 1 is an apparatus for coil configuration in a wireless power transmitter. In this example, the wireless charging device may include a transmitting coil having an inner portion and an outer portion, and a switch configured to initiate current on the inner portion based on a detected condition.

Example 2 includes the apparatus of example 1. In this example, the detected condition may include a distance of separation between the transmitting coil and a receiving coil inductively coupled to the transmitting coil.

Example 3 includes the apparatus of any combination of examples 1-2. In this example initiating the current on the inner portion is configured to generate an increase in magnetic field uniformity of the transmitter coil based on the detected separation.

Example 4 includes the apparatus of any combination of examples 1-3. In this example, the detected condition may include a measure of coil overlap between the transmitter coil and a receiver coil inductively coupled to the transmitter coil.

Example 5 includes the apparatus of any combination of examples 1-4. In this example, the switch is further configured to initiate wireless charging components configured to change characteristics of current driven on the inner portion in comparison the outer portion.

Example 6 includes the apparatus of any combination of examples 1-5. In this example, the inner portion is configured to be electrically coupled to the outer portion in series.

Example 7 includes the apparatus of any combination of examples 1-6. In this example, the inner portion is configured to be electrically coupled to the outer portion in parallel.

Example 8 includes the apparatus of any combination of examples 1-7. This example includes a sensor to detect the condition.

Example 9 includes the apparatus of any combination of examples 1-8. In this example, the sensor may include an orientation sensor to determine an orientation associated with the detected condition, a reactance shift detector configured to detect a reactance shift associated with an overlap of a receiver coil at the transmitter coil, and any combination thereof.

Example 10 includes the apparatus of any combination of examples 1-9. In this example upon detection of the reactance shift the switch is configured to discontinue current on the inner portion of the transmission coil to reduce magnetic coupling of the transmission coil to a receiver coil.

Example 11 is a method for coil configuration in a wireless power transmitter. In this example, the wireless charging device may include detecting a condition related to a receiving coil inductively coupled to a transmitter coil having current initiated on an outer portion, initiating current on an inner portion based on the detected condition.

Example 12 includes the method of example 11. In this example, the detected condition may include a distance of separation between the transmitting coil and the receiving coil.

Example 13 includes the apparatus of any combination of examples 11-12. In this example initiating the current on the inner portion may include generating an increase in magnetic field uniformity of the transmitter coil based on the detected separation.

Example 14 includes the method of any combination of examples 11-13. This example includes detecting a reactance shift due to a measure of coil overlap between the transmitter coil and the receiver coil.

Example 15 includes the method of any combination of examples 11-14. This example includes discontinuing current on the inner portion of the transmission coil upon detection of the reactance shift to reduce magnetic coupling of the transmission coil to the receiver coil.

Example 16 includes the method of any combination of examples 11-15. This example includes initiating wireless charging components configured to change characteristics of current driven on the inner portion in comparison the outer portion.

Example 17 includes the method of any combination of examples 11-16. In this example, the inner portion is configured to be electrically coupled to the outer portion in series.

Example 18 includes the method of any combination of examples 11-17. In this example, the inner portion is configured to be electrically coupled to the outer portion in parallel.

Example 19 includes the method of any combination of examples 11-18. In this example detecting the condition may include detecting an orientation of the wireless power transmitter potentially associated with the detected condition.

Example 20 includes the method of any combination of examples 11-19. In this example initiating current on the inner portion is performed dynamically during wireless power charging operations of the wireless power transmitter.

Example 21 is a system for coil configuration in a wireless power transmitter. In this example, the wireless charging device may include a transmitting coil having an inner portion and an outer portion, a sensor to detect a condition associated with wireless power transmission, and a switch configured to initiate current on the inner portion based on the detected condition.

Example 22 includes the system of example 21. In this example, the detected condition may include a distance of separation between the transmitting coil and a receiving coil inductively coupled to the transmitting coil.

Example 23 includes the system of any combination of examples 21-22. In this example initiating the current on the inner portion is configured to generate an increase in magnetic field uniformity of the transmitter coil based on the detected separation.

Example 24 includes the system of any combination of examples 21-23. In this example, the detected condition may include a measure of coil overlap between the transmitter coil and a receiver coil inductively coupled to the transmitter coil.

Example 25 includes the system of any combination of examples 21-24. In this example, the switch is further configured to initiate wireless charging components configured to change characteristics of current driven on the inner portion in comparison the outer portion.

Example 26 includes the system of any combination of examples 21-25. In this example, the inner portion is configured to be electrically coupled to the outer portion in series.

Example 27 includes the system of any combination of examples 21-26. In this example, the inner portion is configured to be electrically coupled to the outer portion in parallel.

Example 28 includes the system of any combination of examples 21-27. In this example, the sensor may include an integrated component of the wireless power transmitter.

Example 29 includes the system of any combination of examples 21-28. In this example, the sensor may include an orientation sensor to determine an orientation associated with the detected condition, a reactance shift detector configured to detect a reactance shift associated with an overlap of a receiver coil at the transmitter coil, and any combination thereof.

Example 30 includes the system of any combination of examples 21-29. In this example upon detection of the reactance shift the switch is configured to discontinue current on the inner portion of the transmission coil to reduce magnetic coupling of the transmission coil to a receiver coil.

Example 31 is an apparatus for coil configuration in a wireless power transmitter. In this example, the wireless charging device may include a transmitting coil having an inner portion and an outer portion, and a means for adjusting current configured to initiate current on the inner portion based on a detected condition.

Example 32 includes the apparatus of example 31. In this example, the detected condition may include a distance of separation between the transmitting coil and a receiving coil inductively coupled to the transmitting coil.

Example 33 includes the apparatus of any combination of examples 31-32. In this example initiating the current on the inner portion is configured to generate an increase in magnetic field uniformity of the transmitter coil based on the detected separation.

Example 34 includes the apparatus of any combination of examples 31-33. In this example, the detected condition may include a measure of coil overlap between the transmitter coil and a receiver coil inductively coupled to the transmitter coil.

Example 35 includes the apparatus of any combination of examples 31-34. In this example, the means for adjusting current is further configured to initiate wireless charging components configured to change characteristics of current driven on the inner portion in comparison the outer portion.

Example 36 includes the apparatus of any combination of examples 31-35. In this example, the inner portion is configured to be electrically coupled to the outer portion in series.

Example 37 includes the apparatus of any combination of examples 31-36. In this example, the inner portion is configured to be electrically coupled to the outer portion in parallel.

Example 38 includes the apparatus of any combination of examples 31-37. This example includes a sensor to detect the condition.

Example 39 includes the apparatus of any combination of examples 31-38. In this example, the sensor may include an orientation sensor to determine an orientation associated with the detected condition, a reactance shift detector configured to detect a reactance shift associated with an overlap of a receiver coil at the transmitter coil, and any combination thereof.

Example 40 includes the apparatus of any combination of examples 31-39. In this example upon detection of the reactance shift the means for adjusting current is configured to discontinue current on the inner portion of the transmission coil to reduce magnetic coupling of the transmission coil to a receiver coil.

Example 41 is a method for coil configuration in a wireless power transmitter. In this example, the wireless charging device may include detecting a condition related to a receiving coil inductively coupled to a means for transmitting wireless power having current initiated on an outer portion, initiating current on an inner portion based on the detected condition.

Example 42 includes the method of example 41. In this example, the detected condition may include a distance of separation between the means for transmitting wireless power and the receiving coil.

Example 43 includes the apparatus of any combination of examples 41-42. In this example initiating the current on the inner portion may include generating an increase in magnetic field uniformity of the means for transmitting wireless power based on the detected separation.

Example 44 includes the method of any combination of examples 41-43. This example includes detecting a reactance shift due to a measure of coil overlap between the means for transmitting wireless power and the receiver coil.

Example 45 includes the method of any combination of examples 41-44. This example includes discontinuing current on the inner portion of the transmission coil upon detection of the reactance shift to reduce magnetic coupling of the means for transmitting wireless power to the receiver coil.

Example 46 includes the method of any combination of examples 41-45. This example includes initiating wireless charging components configured to change characteristics of current driven on the inner portion in comparison the outer portion.

Example 47 includes the method of any combination of examples 41-46. In this example, the inner portion is configured to be electrically coupled to the outer portion in series.

Example 48 includes the method of any combination of examples 41-47. In this example, the inner portion is configured to be electrically coupled to the outer portion in parallel.

Example 49 includes the method of any combination of examples 41-48. In this example detecting the condition may include detecting an orientation of the wireless power transmitter potentially associated with the detected condition.

Example 50 includes the method of any combination of examples 41-49. In this example initiating current on the inner portion is performed dynamically during wireless power charging operations of the wireless power transmitter.

Not all components, features, structures, characteristics, etc. described and illustrated herein need be included in a particular aspect or aspects. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some aspects have been described in reference to particular implementations, other implementations are possible according to some aspects. Additionally, the arrangement and/or order of circuit elements or other features illustrated in the drawings and/or described herein need not be arranged in the particular way illustrated and described. Many other arrangements are possible according to some aspects.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

It is to be understood that specifics in the aforementioned examples may be used anywhere in one or more aspects. For instance, all optional features of the computing device described above may also be implemented with respect to either of the methods or the computer-readable medium described herein. Furthermore, although flow diagrams and/or state diagrams may have been used herein to describe aspects, the techniques are not limited to those diagrams or to corresponding descriptions herein. For example, flow need not move through each illustrated box or state or in exactly the same order as illustrated and described herein.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. An apparatus for coil configuration in a wireless power transmitter, comprising:
    a transmitting coil comprising an innermost portion and an outermost portion;
    a means for adjusting current configured to initiate current on the innermost portion based on a detected condition; and
    a sensor to detect the condition.

2. The apparatus of claim 1, wherein the detected condition comprises a distance of separation between the transmitting coil and a receiving coil inductively coupled to the transmitting coil.

3. The apparatus of claim 2, wherein initiating the current on the innermost portion is configured to generate an increase in magnetic field uniformity of the transmitter coil based on the detected separation.

4. The apparatus of claim 1, wherein the detected condition comprises a measure of coil overlap between the transmitter coil and a receiver coil inductively coupled to the transmitter coil.

5. The apparatus of claim 1, wherein the means for adjusting current is further configured to initiate wireless charging components configured to change characteristics of current driven on the innermost portion in comparison the outermost portion.

6. The apparatus of claim 1, wherein the innermost portion is configured to be electrically coupled to the outermost portion in series.

7. The apparatus of claim 1, wherein the innermost portion is configured to be electrically coupled to the outermost portion in parallel.

8. The apparatus of claim 1, wherein the sensor comprises:

a gyrometer to determine an orientation associated with the detected condition;

a reactance shift detector configured to detect a reactance shift associated with an overlap of a receiver coil at the transmitter coil; or any combination thereof.

9. The apparatus of claim 8, wherein upon detection of the reactance shift the means for adjusting current is configured to discontinue current on the innermost portion of the transmission coil to reduce magnetic coupling of the transmission coil to a receiver coil.

10. A method for coil configuration in a wireless power transmitter, comprising:

detecting a condition related to a receiving coil inductively coupled to a transmitter coil having current initiated on an outermost portion;

initiating current on an innermost portion based on the detected condition;

detecting a reactance shift due to a measure of coil overlap between the transmitter coil and the receiver coil; and discontinuing current on the innermost portion of the transmission coil upon detection of the reactance shift to reduce magnetic coupling of the transmission coil to the receiver coil.

11. The method of claim 10, wherein the detected condition comprises a distance of separation between the transmitting coil and the receiving coil.

12. The method of claim 11, wherein initiating the current on the innermost portion comprises generating an increase in magnetic field uniformity of the transmitter coil based on the detected separation.

13. The method of claim 10, further comprising initiating wireless charging components configured to change characteristics of current driven on the innermost portion in comparison the outermost portion.

14. The method of claim 10, wherein the innermost portion is configured to be electrically coupled to the outermost portion in series.

15. The method of claim 10, wherein the innermost portion is configured to be electrically coupled to the outermost portion in parallel.

16. The method of claim 10, wherein detecting the condition comprises detecting an orientation of the wireless power transmitter potentially associated with the detected condition.

17. The method of claim 10, wherein initiating current on the innermost portion is performed dynamically during wireless power charging operations of the wireless power transmitter.

18. A system for coil configuration in a wireless power transmitter, comprising:

a transmitting coil comprising an innermost portion and an outermost portion;

a sensor to detect a condition associated with wireless power transmission; and a switch configured to initiate current on the innermost portion based on the detected condition.

19. The system of claim 18, wherein the detected condition comprises a distance of separation between the transmitting coil and a receiving coil inductively coupled to the transmitting coil, wherein initiating the current on the innermost portion is configured to generate an increase in magnetic field uniformity of the transmitter coil based on the detected separation.

20. The system of claim 18, wherein the detected condition comprises a reactance shift due to a measure of coil overlap between the transmitter coil and the receiver coil, wherein the switch is configured to discontinue current on the innermost portion of the transmission coil upon detection of the reactance shift to reduce magnetic coupling of the transmission coil to the receiver coil.

21. The system of claim 18, wherein the switch is further configured to initiate wireless charging components configured to change characteristics of current driven on the innermost portion in comparison the outermost portion.

22. The system of 21, further comprising a sensor to detect the condition, wherein the sensor comprises:

a gyrometer configured to determine an orientation associated with the detected condition;

a reactance shift detector configured to detect a reactance shift associated with an overlap of a receiver coil at the transmitter coil; or any combination thereof.

\* \* \* \* \*